May 8, 1956 C. A. BURKHOLDER 2,744,551
VENEER FEEDER AND CONVEYOR UNIT
Filed Aug. 16, 1954 6 Sheets-Sheet 1
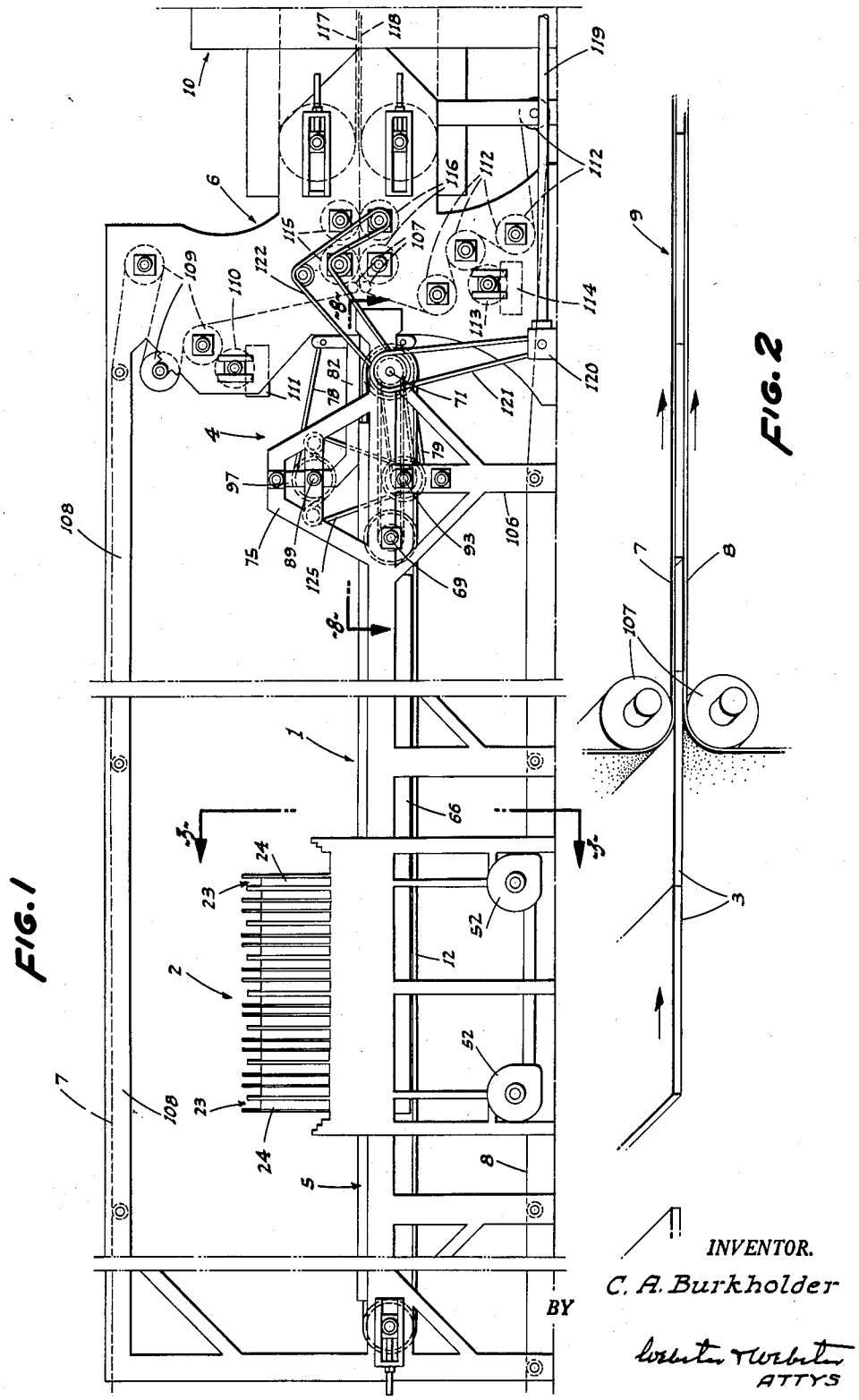
INVENTOR.
C. A. Burkholder
BY
ATTYS May 8, 1956
C. A. BURKHOLDER
2,744,551
VENEER FEEDER AND CONVEYOR UNIT
Filed Aug. 16, 1954
6 Sheets-Sheet 2
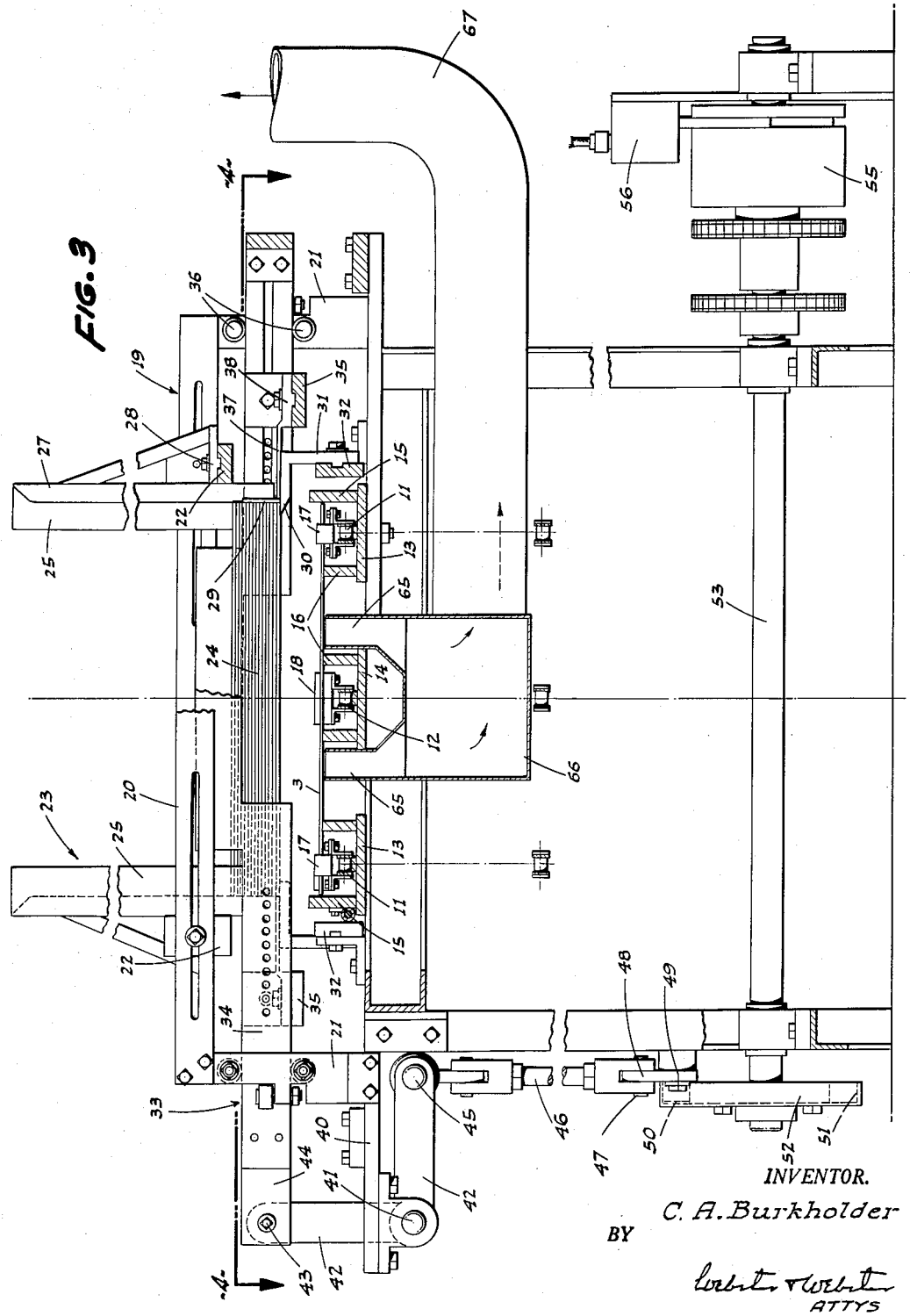
INVENTOR.
C. A. Burkholder
BY
ATTYS

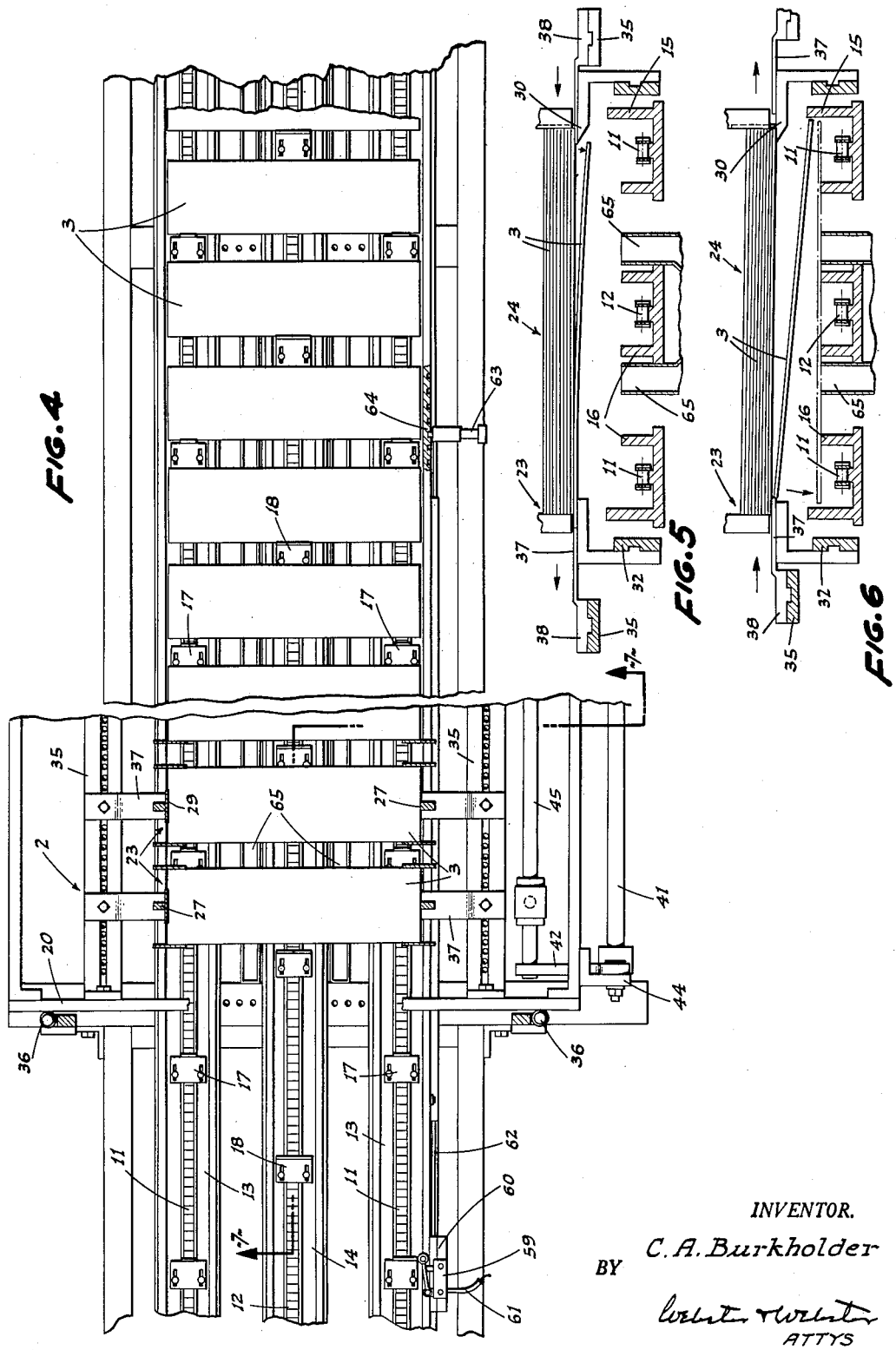

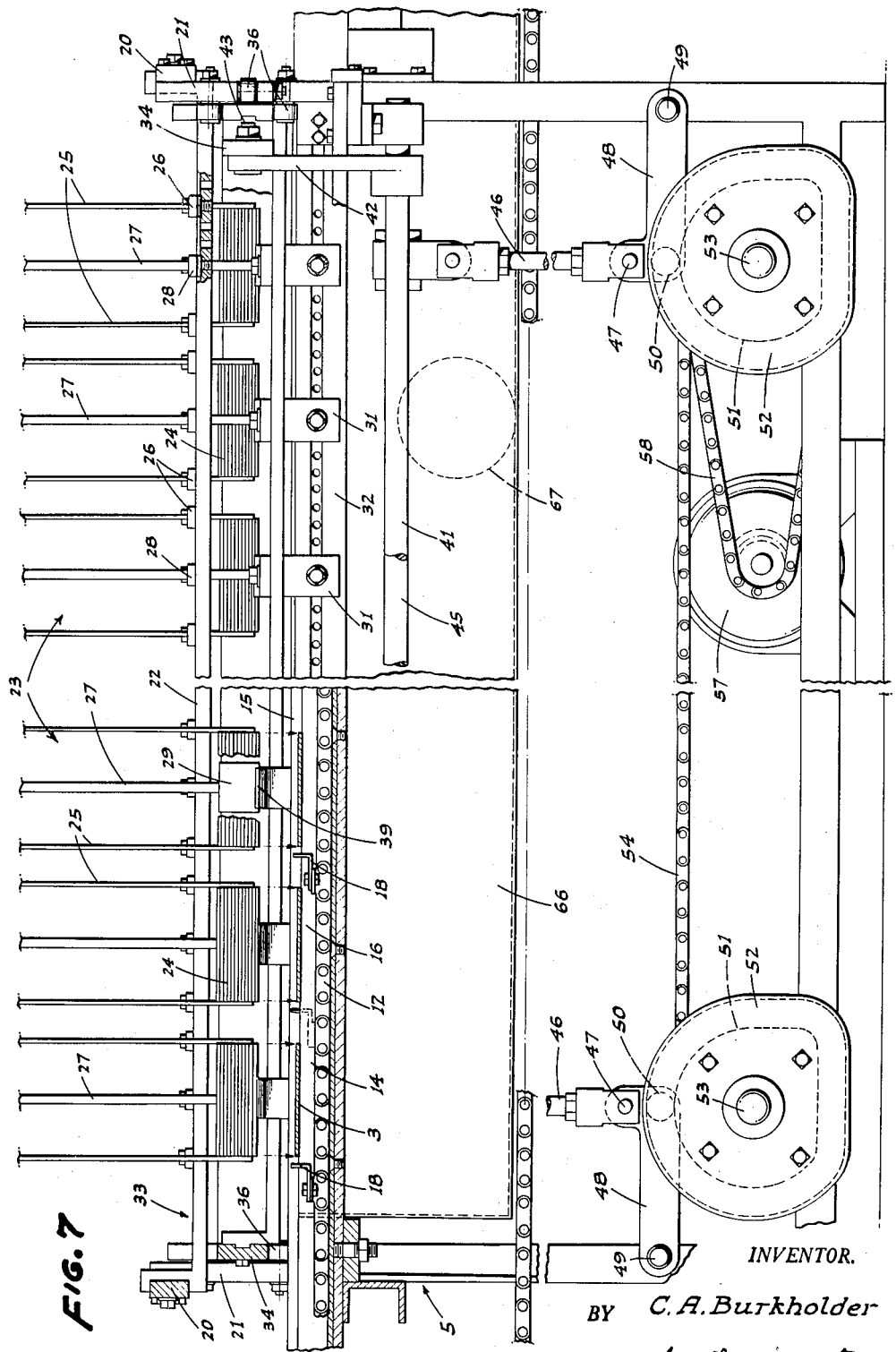

May 8, 1956
C. A. BURKHOLDER
2,744,551
VENEER FEEDER AND CONVEYOR UNIT
Filed Aug. 16, 1954
6 Sheets-Sheet 5
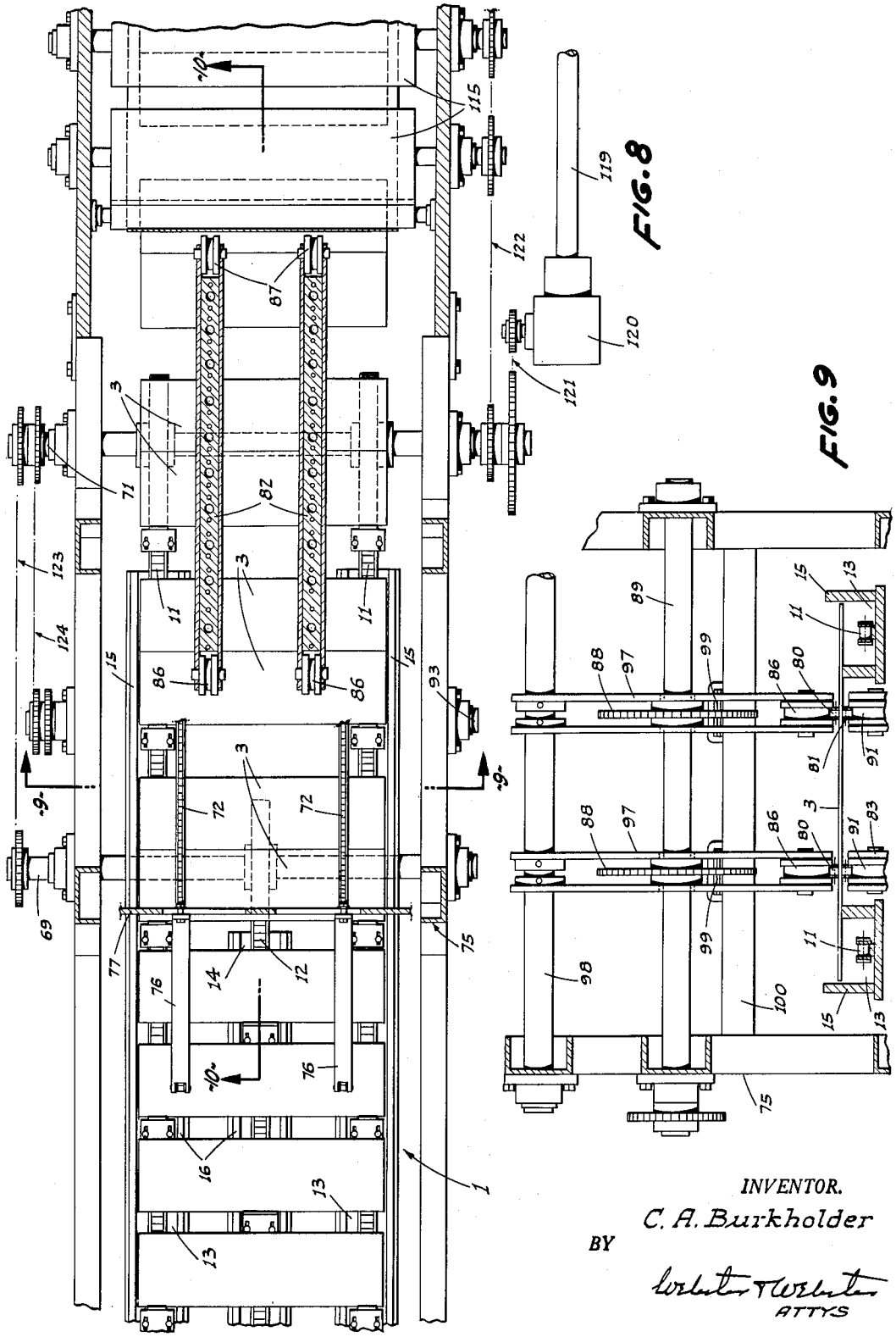
INVENTOR.
C. A. Burkholder
BY
ATTYS

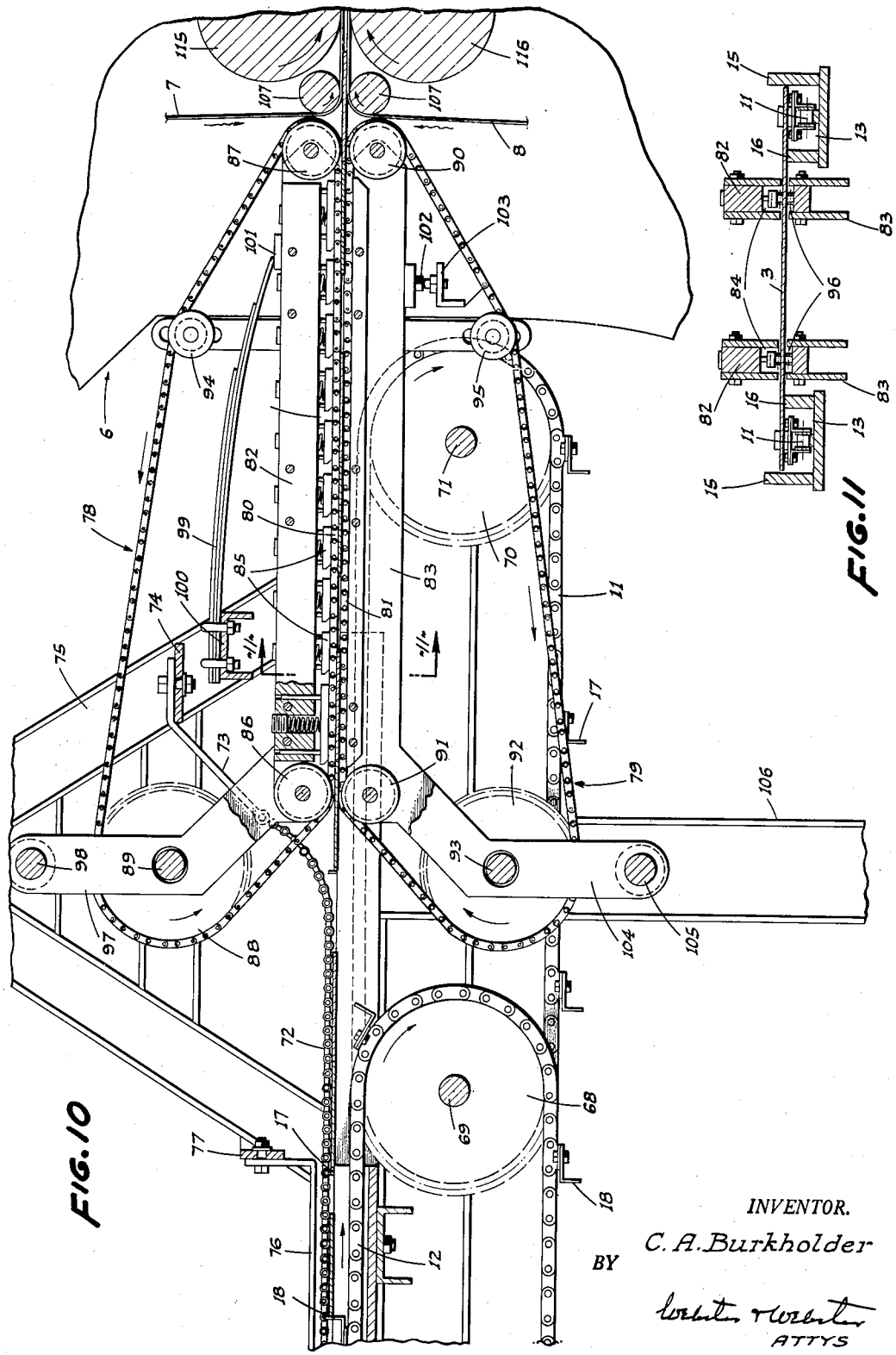

United States Patent Office 2,744,551
Patented May 8, 1956

2,744,551

VENEER FEEDER AND CONVEYOR UNIT

Claude A. Burkholder, Fresno, Calif., assignor to General Box Distributors, San Francisco, Calif., a corporation of California Application August 16, 1954, Serial No. 450,153

14 Claims. (Cl. 144—279)

This invention is directed to apparatus for use in connection with the manufacture of composite paper and wood veneer sheet material. This material is comprised of outer laminations or runs of heavy-duty paper, such as "kraft," and an intermediate lamination of wood veneer; such intermediate lamination being initially separate, transversely extending sections of wood veneer, full width of the sheet but relatively narrow longitudinally thereof, and adhesively engaged or bonded between the outer laminations of paper.

Such composite paper and wood veneer sheet material is manufactured in a continuous run by the method contemplated in my copending application for United States Letters Patent, Serial No. 559,730, filed January 17, 1956; the instant application being directed to, and it is a major object to provide, novel apparatus for practicing certain steps of such method of manufacture.

In an initial stage of such manufacture of composite paper and wood veneer sheet material, a multiplicity of separate wood veneer sections, in predetermined relation to each other, are recurringly fed in timed relation onto an endless, initial conveyor to form a longitudinal row thereon, and it is another important object of this invention to provide a novel veneer feeding unit for such purpose.

Another object of the invention is to provide a veneer feeding unit, as in the preceding paragraph, wherein the parts are adjustable to predetermine the spacing between the wood veneer sections as fed to the initial conveyor; there being a novel intermittent drive mechanism for said veneer feeding unit operative to cause the latter to recurringly and simultaneously drop, from the several hoppers included in said unit, a corresponding number of the wood veneer sections onto said initial conveyor.

In a subsequent step in the manufacture of the composite paper and wood veneer sheet material, the wood veneer sections are carried, in said longitudinal row, by the initial conveyor to a transfer conveyor whose purpose is to transfer such wood veneer sections to a sheet material laminating mechanism; it being an additional object of the present invention to provide a transfer conveyor, as above, of novel construction and function. This transfer conveyor works in timed relation to the initial conveyor and said sheet material laminating mechanism, and is operative to transfer the wood veneeer sections therebetween, while maintaining the same in exactly the same relationship to each other as they existed at the time of delivery from said initial conveyor. This is an extremely important feature, for the reason that under certain working conditions the initial conveyor delivers the wood veneer sections to the transfer conveyor with spacing between certain adjacent sections, and with other adjacent sections in edge to edge engagement.

A further object of the invention is to provide cooperative apparatus, for use in a continuous-run method of manufacturing composite paper and wood veneer sheet material, which functions smoothly, accurately, and positively—with all the units of the apparatus actuated by and timed from a common drive; the transfer conveyor being arranged so that such wood veneer sections immediately enter the sheet material laminating mechanism when fed from said transfer conveyor, and which is advantageous in said maintenance of the correct relative positions of the wood veneer sections.

A still further object of the invention is to incorporate, in the apparatus, an initial conveyor which is adjustable to the end that certain of the wood veneer sections as delivered to the transfer conveyor are automatically spaced lengthwise of the row, with others in edge to edge engagement or with all of the wood veneer sections so spaced, selectively. The composite paper and wood veneer sheet material is primarily adapted—but not limited—for use in the manufacture of boxes, as—for example—the box shown in copending application for United States Letters Patent, Serial No. 447,225, filed August 2, 1954. In this type of box the wood veneer sections, which comprise the central or intermediate lamination of the composite sheet material, are spaced in certain instances and not in others, and it therefore is of substantial advantage to provide an initial conveyor—as above—which can automatically accomplish the desired spacing of the wood veneer sections prior to lamination thereof, in the sheet material laminating mechanism, between the outer laminations of paper.

It is also an object of the invention to provide apparatus, for use in a continuous-run method of manufacturing composite paper and wood veneer sheet material, which is designed for long, uninterrupted service, with a minimum of manual attention being required.

Still another object of the invention is to provide a practical, reliable, and durable apparatus, for use in a continuous-run method of manufacturing composite paper and wood veneer sheet material, and apparatus which will be exceedingly effective for the purpose for which it is designed.

These objects are accomplished by means of such structure and relative arrangement of parts as will fully appear by a perusal of the following specification and claims.

In the drawings:

Fig. 1 is a side elevation, foreshortened and somewhat diagrammatic, of the apparatus, i. e., the veneer feeding unit, the initial conveyor, and the transfer conveyor, as arranged in combination to feed the veneer sections to the sheet material laminating mechanism.

Fig. 2 is an enlarged fragmentary perspective view showing diagrammatically the wood veneer sections as delivered in predetermined relation to each other from the transfer conveyor to the initial laminating or nip rolls of the sheet material laminating mechanism; the view showing the composite sheet material running beyond said nip rolls.

Fig. 3 is an enlarged transverse sectional elevation on line 3—3 of Fig. 1; the view is substantially the left half thereof showing the front end of the veneer feeding unit in elevation, and the remaining half of the view being broken away and partly in section to illustrate with more clarity certain of the parts of said unit.

Fig. 4 is a fragmentary sectional plan view of the veneer feeding unit taken on line 4—4 of Fig. 3; the view showing additionally the adjacent portion of the initial veneer conveyor.

Figs. 5 and 6 are fragmentary transverse sectional elevations showing the successive steps in the feeding of a wood veneer section from the bottom of one of the stacks, in the veneer feeding unit, onto the initial conveyor.

Fig. 7 is an enlarged longitudinal elevation, foreshortened and partly broken away and in section, of the veneer feeding unit; the view being taken on line 7—7 of Fig. 4.

Fig. 8 is an enlarged fragmentary sectional plan view of the transfer conveyor; the view being taken on line 8—8 of Fig. 1; the transfer and drive chains being omitted.

Fig. 9 is a transverse sectional elevation on line 9—9 of Fig. 8.

Fig. 10 is a longitudinal sectional elevation of the transfer conveyor; the view being taken on line 10—10 of Fig. 8.

Fig. 11 is a transverse sectional elevation taken on line 11—11 of Fig. 10.

Referring now more particularly to the drawings, and to the characters of reference marked thereon, the apparatus comprises a horizontal, longitudinally extending, wood veneer conveyor, indicated generally at 1. Associated with the conveyor 1 at a point intermediate its ends is a wood veneer feeding unit, indicated generally at 2; said feeding unit 2 being operative—recurringly and in timed relation to travel of the conveyor 1—to simultaneously drop a predetermined number of wood veneer sections 3 onto the conveyor 1, with said sections extending transversely of the conveyor but forming a longitudinal row on the latter.

The row of wood veneer sections 3 is carried by the upper run of the conveyor 1 to, and delivered into, a transfer conveyor, indicated generally at 4. The conveyor 1, feeding unit 2, and transfer conveyor 4 are all arranged in connection with an upstanding, longitudinally extending, main frame, indicated generally at 5.

The purpose of the transfer conveyor 4 is to receive the row of wood veneer sections 3 from the initial conveyor 1 and to transfer said row of sections—while maintaining the latter in exactly the same relationship each to the other as they existed on the conveyor 1—to a sheet material laminating mechanism, indicated generally at 6. In the sheet material laminating mechanism 6 the wood veneer sections 3 are run between, and adhesively bonded to, outer laminations which comprise an upper run 7 and a lower run 8, both of heavy-duty paper, such as "Kraft."

The row of wood veneer sections 3 between such runs of paper forms, in effect, an intermediate lamination. The composite paper and wood veneer sheet material produced in the apparatus, which material includes the runs 7 and 8 of paper, and the wood veneer sections therebetween, is indicated generally at 9.

From the sheet material laminating mechanism 6 the formed composite paper and wood veneer sheet material 9 delivers into a kiln, indicated in part at 10, and in which kiln the sheet material is carried under compression in the presence of heat to not only dry said sheet material, but to enhance the bond between the laminations. The kiln 10 is the subject of copending application for United States Letters Patent, Serial No. 451,903, filed August 24, 1954.

The foregoing is the general combination of the apparatus, and in detail such apparatus is constructed and functions as follows:

The horizontal, longitudinally extending, initial, veneer conveyor 1 is mounted on the main frame 5 and includes a pair of outer endless chains 11, and an intermediate or central endless chain 12 therebetween; the upper runs of said chains 11 and 12 all being in the same horizontal longitudinal plane and being suitably sprocket-supported and driven from one end.

The upper runs of the outer endless chains 11 are carried in longitudinal channels 13 while the upper run of the central endless chain 12 is carried in a longitudinal channel 14. The outermost flanges 15 of channels 13 are of sufficient height for end abutment with—and to provide longitudinal guides for—the wood veneer sections 3 of the row which is advanced by the upper run of the conveyor 1; the remaining flanges 16 of the channels 13 and 14 being of reduced height to form rails on which said wood veneer sections slide as the row is advanced by the conveyor 1 (see Fig. 3).

The outer endless chains 11 are fitted, at longitudinally spaced points in the length thereof, with transversely alined, upstanding, L-shaped pusher lugs 17 adjustably secured to said chains. Similar upstanding, L-shaped pusher lugs 18 are adjustably secured to the central endless chain 12, being disposed in a transverse vertical plane which lies intermediate the corresponding planes of adjacent, transversely alined pairs of the pusher lugs 17. The chains 11 and 12 are driven simultaneously at the same speed.

The wood veneer sections 3 are fed onto the conveyor 1 in a row wherein said sections are longitudinally spaced, certain of the wood veneer sections being engaged from the rear edge adjacent the ends, and advanced by, the pusher lugs 17, while others of said sections are engaged from the rear edge centrally of the ends, and advanced by the pusher lugs 18.

In the embodiment here illustrated alternate ones of the wood veneer sections 3 are engaged by the pusher lugs 17 and 18, respectively.

As the initial conveyor runs travel below the feeding unit 2, the latter—working in timed relation to said conveyor 1—recurringly drops a plurality of the wood veneer sections 3 onto said conveyor 1 in proper position for engagement by the lugs 17 and 18, as above, and so that the row of said wood veneer sections on the conveyor 1 is continuous; i. e., has no gaps other than the desired or predetermined spacing which initially exists between said sections 3.

The veneer feeding unit 2 comprises the following:

An open rectangular, stationary guide and mounting frame, indicated generally at 19, spans over the conveyor 1 in spaced relation thereto; such stationary guide and mounting frame including transverse end bars 20 supported by fixed corner posts 21 rigid with the main frame 5. Additionally, the stationary guide and mounting frame 19 includes transversely spaced, longitudinal side bars 22 adjustably but normally rigidly secured to the end bars 20. The stationary guide and mounting frame 10 supports, within the confines thereof, a plurality of upstanding, transversely extending hoppers disposed in a longitudinal row and with spacing corresponding to that of the spacing for the wood veneer sections 3 on the conveyor 1; said hoppers being each indicated generally at 23.

Each hopper 23 is adapted to receive a stack 24 of the wood veneer sections 3, with the latter extending transversely of—and spanning across—the conveyor 1. Each such hopper is defined by four upstanding, hopper forming plates 25, two of which are secured to one of the side bars 22 and the remaining two of which are secured to the other side bar 22.

The hopper forming plates 25 are adjustably mounted in connection with said bars 22 by means of attachment feet, indicated at 26. Additionally, at the ends each hopper includes end posts 27 likewise adjustably attached to the related side bar 22 by feet 28.

At one end of each hopper the corresponding end post 27 is fitted, at its lower end, with a laterally inwardly facing flusher plate 29. Each stack 24 of wood veneer sections is supported in the corresponding hopper 23 by a transversely spaced pair of alined, laterally inwardly projecting tongues 30 which engage beneath—but only to a short extent—each end of the stack 24; the tongues 30 having depending legs 31 which are longitudinally adjustably secured to fixed bars 32 which extend lengthwise of the stationary frame of the feeding unit 2; the longitudinal bars 32 being disposed so that the tongues 30 slightly overhang the upper runs of the outer endless chains 11.

An open, rectangular shuttle frame, indicated generally at 33, extends horizontally and transversely below the stationary guide and mounting frame 19, being of such extent that it not only spans the conveyor 1, but projects laterally outwardly therefrom some distance on both sides.

The shuttle frame 33 includes transverse end bars 34 connected at points laterally out from both sides of the conveyor 1 by longitudinal side bars 35 adjustably attached, as shown.

The shuttle frame 33 is slidably supported for reciprocation, in a transverse horizontal plane, by means which includes rollers 36 journaled on the guide and mounting frame 19, and particularly on the corner posts 21.

A thin, flat pusher slide 37 lies flush atop each tongue 30, normally being retracted clear of the lowermost wood veneer section in the corresponding hopper 23; each such slide being attached, in longitudinally adjustable relation, by a foot 38 to the adjacent longitudinal side bar 35.

Each pusher slide 37 lies beneath the lower end of the adjacent end post 27, and each flusher plate 29 is notched, as at 39, for passage—in guided relation—of the corresponding slide 37. In their normal or quiescent positions the slides 37 are disposed with their free ends adjacent but slightly clear of the ends of the lowermost wood veneer section in the corresponding stack 24.

In order to drop all of the lowermost wood veneer sections 3 simultaneously from the hoppers 23, the shuttle frame 33 is actuated through a cycle which first advances and then retracts all of the pusher slides 37 on one side, whereupon said lowermost wood veneer sections are pushed laterally and escape downwardly from the corresponding tongues 30 at the adjacent ends, and then instantaneously thereafter advances and retracts all of the pusher slides 37 on the opposite side, whereby the lowermost sections are pushed off and drop downwardly from the corresponding tongues 30 (see Figs. 5 and 6 which depict such cyclic action).

The timing of each full cycle of operation of the shuttle frame 33 is such—in relation to the speed of travel of the upper runs of the conveyor 1—that full sets of the lowermost wood veneer sections are dropped onto said conveyor recurringly and to the end that the row of sections thereon remains unbroken.

As all of the parts of the hoppers 23 are adjustably mounted, said hoppers can be set for different sized wood veneer sections, for different spacing between the hoppers, etc.

The cyclic operation of the shuttle frame 33 is accomplished as follows:

Longitudinally spaced brackets 40 project laterally out from one side of the stationary guide and mounting frame 19, and a longitudinal shaft 41 extends between—and is journaled to—said brackets. Adjacent the ends thereof the shaft 41 is fitted with bellcrank levers 42, the upper ends of which are pivoted, as at 43, to rigid ears 44 which project out from the adjacent side of the shuttle frame 33.

At the other ends, which are the lower and inner ends, the bellcrank levers 42 are pivoted to another longitudinal shaft 45.

Pull linkage 46 is connected to the shaft 45 adjacent each of the bellcrank levers 42, and these linkages depend to pivotal connection, as at 47, with dog-leg swing levers 48 pivoted at the opposite end, as at 49, to the frame. The swing levers 48 are formed, directly below the pivots 47, each with a traveler pin 50, and each such traveler pin 50 runs in an internal cam groove 51 in a rotary cam 52 attached to the adjacent end of a cross shaft 53.

The internal cam groove 51 in each rotary cam 52 is generated to a pattern which, with one revolution of each cam from a starting position, works the assembly of pull linkages 46 and bellcrank levers 42 in a manner to cause one cyclic operation of the shuttle frame, as hereinbefore described.

The cross shafts 53 are recurringly and simultaneously driven through one revolution, to cause each such cyclic operation of the shuttle frame 33, as follows:

On the side of the main frame opposite the rotary cams 52 the cross shafts 53 are connected together by an endless chain and sprocket unit 54, and one of said shafts 53 is driven by a one-cycle or one-revolution clutch 55 controlled by a solenoid 56, and which clutch derives its drive from an electric motor 57 coupled to the clutch by an endless chain and sprocket unit 58. Each time that the solenoid 56 is energized, it causes the clutch 55 to engage the electric motor drive to the related cross shaft 53, but for one revolution only.

The solenoid 56 is actuated in timed relation from the conveyor 1 as follows:

A micro-switch 59 (see Fig. 4) is mounted alongside the conveyor 1 at a point back of the feeding unit 2, and is carried on a mounting block 60 which is adjustable lengthwise along a part of the main frame 5.

Certain of the pusher lugs 17 on the near, outer endless chain 11 have the upstanding pusher element offset laterally outwardly, whereby to engage and close the micro-switch 59 upon passing the same.

Each time that the micro-switch 59 is closed it energizes the solenoid 56 through a circuit wiring system, shown in part at 61. Thus, each time the micro-switch 59 is closed it causes actuation of the solenoid 56 and clutch 55, which in turn results in one cyclic operation of the shuttle frame 33.

To the end that the timing may be accurately set, the micro-switch mounting block 60 is adjustable lengthwise of the conveyor 1 by a push-pull rod 62 connected to said block and thence extending forwardly to a station ahead of the feeding unit, and at which station an operator stands. At such station the push-pull rod 62 is secured to a spring-pressed holding pin 63 selectively engaged in one socket of an index plate 64. Thus, by merely shifting the holding pin 63 and push-pull rod 62 longitudinally forwardly or rearwardly, the operator can exactly time the functioning of the feeding unit 2 to the travel of the endless conveyor 1.

The wood veneer sections 3 which comprise the row on the initial endless conveyor 1, and which sections are advanced by the pusher lugs 17 and 18, are maintained firmly against the rail-forming flanges 16 by means of suction troughs 65 which extend lengthwise of said conveyor 1 intermediate the chains 11 and 12; such troughs being in communication with a suction box 66 connected to a suction conduit 67 which leads to a vacuum pump (not shown). This arrangement effectively prevents any flutter of the wood veneer sections as they are continuously advanced in a row by the endless conveyor 1.

At the forward end of said endless conveyor 1 the row of wood veneer sections 3 is delivered therefrom to the transfer conveyor 4, but before this occurs certain adjacent ones of said sections 3 are brought into edge to edge abutment so that the composite paper and wood veneer sheet material 9, as formed, has certain of said sections 3 spaced and others not spaced. Composite paper and wood veneer sheet material with the wood veneer sections in such relation is desired in certain instances for the manufacture of boxes.

The bringing together in edge to edge relation; i. e.— the closing of the space between certain adjacent ones of the wood veneer sections 3 (here each progressive pair thereof)— is accomplished as follows, and as shown particularly in Fig. 10.

The central endless chain 12 terminates at its forward end some distance short of the corresponding ends of the outer endless chains 11; the forward sprocket for said central endless chain being indicated at 68, and which sprocket is carried on a transverse drive shaft 69. The forward sprockets which carry the outer endless chains 11 are indicated at 70, and such latter sprockets are carried on a transverse drive shaft 71.

By reason of the fact that the central endless chain 12 terminates short of the forward end of the outer endless chains 11, the pusher lugs 18 on the central endless chain 12 drop away from the corresponding wood veneer sections 3 at a point short of the forward or discharge end of the initial endless conveyor 1. When the pusher lugs 18 fall away from the corresponding wood veneer sections 3 on the initial endless conveyor 1, said sections—being no longer pushed from the rear edge—stop for a moment their advance on the rails 16, certain of which extend forward to a termination close to the forward sprockets 70. As a result of the wood veneer sections, from which the pusher lugs 18 escape, being idle for a moment, they are then engaged in edge to edge relation with—and carried forward by—the next following section being advanced by the pusher lugs 17 on the outer endless chains 11.

During the period of such action the wood veneer sections which are brought into edge to edge engagement, as above, lie beneath a pair of transversely spaced, longitudinally extending drag chains 72, and which drag chains assure that each wood veneer section, when released by the pusher lug 18, will not flutter and will be held against any possible forward travel until picked up in edge-abutting relation by the next following section being advanced, in the manner above described.

The drag chains 72, which have a certain amount of slack therein, are anchored—at the forward end—to arms 73 attached to a cross member 74 fixed in connection with side A-frames 75 of the transfer conveyor 4.

At their rear ends the chains 72 are connected to other rearwardly projecting arms 76 secured to a cross member 77 likewise connected between the side A-frame 75.

After the space or gap between the predetermined ones of the wood veneer sections 3 has been closed, the row of said sections, without any further change in the relative positions of the sections, continues to be advanced by the initial endless conveyor 1, and is delivered into the transfer conveyor 4; the latter having the following construction and function:

Laterally inwardly from the longitudinal vertical planes of the outer endless chains 11, the transfer conveyor 4 includes transversely spaced pairs of upper and lower endless chains, indicated generally at 78 and 79. Each pair of said upper and lower endless chains 78 and 79, and which chains extend in a vertical longitudinal plane, have adjacent parallel runs; said runs being the lower run 80 of the upper endless chain 78 and the upper run 81 of the lower endless chain 79. The runs 80 and 81 of the pairs of endless chains 78 and 79 are disposed in a horizontal plane in alinement with the row of wood veneer sections 3 being advanced by the initial endless conveyor 1; the outer runs of said latter conveyor lapping—in adjacent relation—the corresponding runs 80 and 81 for a portion of their length.

The endless chains 78 and 79 of each pair thereof are supported as follows:

An upper longitudinal guide bar 82 extends above the run 80, while a lower longitudinal guide bar 83 extends below the run 81. The upper longitudinal guide bar is formed with a downwardly opening channel 84 in which the run 80 engages; there being a row of downwardly spring-pressed guide shoes 85 in the channel 84 working against the top of said run 81.

At the ends of the upper longitudinal guide bar 82 the upper endless chain 78 turns about sprockets 86 and 87 on said bar, while at the rear and at an elevated point the upper endless chain 78 is trained about an upper drive sprocket 88; the sprockets 88 being carried on a cross shaft 89 which spans between, and is journaled in connection with, the side A-frames 75.

Each lower endless chain 79 is similarly mounted, being carried over sprockets 90 and 91 journaled on opposite ends of the lower longitudinal guide bar 63. Additionally, said lower endless chain 79 is trained, at a rear end lower portion, about a lower drive sprocket 92 fixed on a cross shaft 93. Both the upper endless chain 78 and the lower endless chain 79 cooperate with chain tighteners, indicated at 94 and 95, respectively.

The lower longitudinal guide bars 83 are each formed with an upwardly opening channel 96 in which the corresponding run 81 travels; said run thus being supported against the pressure of the spring-pressed guide shoes 85 carried by the upper longitudinal guide bar 82.

Each of the upper longitudinal guide bars 82 is fitted, at its rear end, with an upstanding leg 97 secured to a cross shaft 98 spanning between the side A-frames 75, and as so mounted the guide bar 82 is capable of limited vertical floating motion which is resisted from above by a leaf spring 99. Each leaf spring 99 is mounted, at its rear end, in connection with a cross member 100, and thence the spring extends forward and engages a pad 101 on the forward end of the related guide bar 82.

This arrangement assures that said upper longitudinal guide bar 82 is always urged yieldably downward for the proper maintenance of the guide shoes 85 in engagement for the full length of the row of said shoes with the run 81 of the corresponding endless chain. Each upstanding leg 97 is provided with an over-sized bore as shown, through which the cross shaft 89 extends, to permit of limited motion of the upper longitudinal guide bar 82 about cross shaft 98 as its axis.

Each lower longitudinal guide bar 83 is supported at its forward end, by an adjustable stop 102 carried on a cross member 103, while at the rear end each such bar 83 is formed with a depending leg 104, secured—at its lower end—to a cross shaft 105 spanning between, and journaled in connection with, posts 106 of the main frame.

Each leg 104 has an enlarged bore, as shown, for the passage of the cross shaft 93, and to the end that the corresponding guide bar 83 may be adjusted up or down to a limited extent, and for the purpose of providing proper alinement for the upper run 81 of the related lower endless chain 79.

As the row of wood veneer sections 3 is advanced by the forward portion of the initial endless conveyor 1, said row is transferred from such conveyor 1 to the transfer conveyor 4; i. e., to the cooperating parallel longitudinal runs 80 and 81 of each pair of the endless chains 78 and 79.

By reason of the fact that adjacent portions of the initial conveyor 1 and transfer conveyor 4 lap each other, the pusher lugs 17 fall away from the engaged wood veneer sections only after said transfer conveyor has come into play to continue the advance of the row of sections 3, maintaining the latter in the same relationship to each other as they were received from the initial endless conveyor 1; the row finally being fed from the forward end of the transfer conveyor into the sheet material laminating mechanism 6.

Such sheet material laminating mechanism 6 includes—immediately adjacent the forward end sprockets 87 and 90 of the transfer conveyor 4—a pair of horizontal, transversely extending nip rolls 107 in vertical alinement; said nip rolls being disposed so that their adjacent working faces receive each wood veneer section closely therebetween immediately as such section is being delivered from the forward end of the transfer conveyor 4.

In other words, the end sprockets 87 and 90 are sufficiently close to the nip rolls 107 that each advancing wood veneer section is engaged between said nip rolls before it wholly escapes the cooperating runs 80 and 81 of the endless chains 78 and 79; thus assuring that there cannot be any change in position—lengthwise of the direction of travel—of the wood veneer sections as they move from the transfer conveyor 4 to the sheet material laminating mechanism 6.

In said sheet material laminating mechanism 6 the row of wood veneer sections 3 is laminated between the upper and lower runs 7 and 8 of heavy-duty paper. The upper run of paper 7 is guided from a spool of paper (not shown) along an overhead frame 108 forwardly to the sheet material laminating mechanism 6, and thence extends downwardly; being trained about a plurality of upper direction-changing rolls 109. During the course of this travel an adhesive is applied to the upper run 7 of paper by an adhesive transfer roll 110 which runs, at its lower portion, in an adhesive containing trough 111, and at another portion against one of the rolls 109.

Similarly, the lower run 8 of paper feeds from a spool (not shown) forwardly in guided relation in the lower portion of the main frame 5 and thence turns upwardly and runs about lower direction-changing rolls 112. Here also adhesive is applied to the proper face of the lower run 8 of paper by an adhesive transfer roll 113 whose lower portion is disposed in an adhesive containing trough 114, with an upper portion of said roll 113 working against one of the lower direction-changing rolls 112. The above general arrangement is shown in Fig. 1.

The runs 7 and 8 of paper, after application of adhesive to the proper face thereof, continue toward—and turn about—the adjacent or cooperating faces of the nip rolls 107. From the nip rolls 107 the runs 7 and 8 advance between cooperating pairs of upper and lower pressure and feed rolls, indicated at 115 and 116, respectively.

From the nip rolls 107 the runs 7 and 8 of paper advance with the row of wood veneer sections 3 therebetween, forming the composite paper and wood veneer material 9; the pressure and feed rolls 115 and 116 cooperating to impart a bonding as well as feeding action on the sheet material. From the rolls 115 and 116 the composite paper and wood veneer sheet material 9 feeds into the kiln 10, wherein said material is carried forward between adjacent cooperating runs 117 and 118 of endless foraminous conveyors which said kiln includes.

For the purpose of accomplishing the driving of the initial conveyor 1, the transfer conveyor 4, and the rolls 115 and 116 of the sheet material laminating mechanism 6, all in timed relation, the drive is taken from a common longitudinal drive shaft 119 which extends alongside said mechanism 6 adjacent floor level. The drive shaft 119, which is energized from a motor source (not shown) actuates a gear box 120, and an endless chain and sprocket 121 drives the transverse shaft 71 of the initial endless conveyor 1 (see Fig. 8).

The upper and lower pressure rolls 115 and 116 are driven from the transverse shaft 71 by an endless chain and sprocket unit 122 on one side of the apparatus. On the other side of the apparatus the front transverse shaft 69 is driven from the transverse shaft 71 by an endless chain and sprocket unit 123.

A separate endless chain and sprocket unit 124 drives the lower cross shaft 93 of the transfer conveyor 4, from the shaft 71, and in turn the upper cross shaft 89 of said transfer conveyor is driven by a further endless chain and sprocket unit 125.

With the described apparatus, including—in novel combination—the initial conveyor 1, the feeding unit 2, the transfer conveyor 4, and the sheet material laminating mechanism 6—all working in cooperative relation—composite paper and wood veneer sheet material can be manufactured in a continuous run accurately, positively, and at relatively high speeds; thereby producing the material in an effective and economical manner.

When it is desired that the composite paper and wood veneer sheet material 9 be formed with spacing between all of the wood veneer sections 3, the central endless chain 12 is either removed from the apparatus or the pusher lugs 18 detached. This results in the wood veneer sections remaining throughout the length of the apparatus with the same spacing as when delivered from the feeding unit 2; additional pusher lugs 17 being added to the outer endless chains 11 so that each section 3 is lug-engaged and advanced for the full length of the initial endless conveyor 1. Such spacing of all the sections 3 is of course continued or maintained in the transfer conveyor 4 and into the laminating mechanism 6.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. Apparatus for continuous-run manufacture of composite sheet material having an intermediate lamination of transversely extending wood veneer sections in a longitudinal row, and outer laminations of paper in longitudinal runs adhesively bonded thereto; said apparatus comprising, in timed driven relation, a longitudinal initial conveyor having an advancing run, means to feed a row of wood veneer sections onto the initial conveyor for advance by said run with predetermined spacing between certain of said sections, said advancing run including elements to maintain said spacing throughout the length of said run, a sheet material laminating mechanism disposed adjacent but beyond the delivery end of the initial conveyor, such mechanism feeding the runs of paper and being operative to receive and adhesively bond the row of wood veneer sections therebetween, and a transfer conveyor operative to transfer the row of wood veneer sections from the delivery end of the initial conveyor to said laminating mechanism without altering said spacing.

2. Apparatus for continuous-run manufacture of composite sheet material having an intermediate lamination of transversely extending wood veneer sections in a longitudinal row, and outer laminations of paper in longitudinal runs adhesively bonded thereto; said apparatus comprising, in timed driven relation, a longitudinal initial conveyor having an advancing run, means to feed a row of wood veneer sections onto the initial conveyor for advance by said run, a sheet material laminating mechanism disposed adjacent but beyond the delivery end of the initial conveyor, such mechanism feeding the runs of paper and being operative to receive and adhesively bond the row of wood veneer sections therebetween, and a transfer conveyor operative to transfer the row of wood veneer sections from the delivery end of the initial conveyor to said laminating mechanism; said transfer conveyor including a pair of longitudinal, vertically alined endless conveyors having adjacent, cooperating, longitudinal runs driven in the direction of advance; said alined runs being disposed to receive the row of wood veneer sections in frictional engagement therebetween at an initial point rearwardly of the point of delivery of said row from said initial conveyor, and the discharge point of said alined runs being closely adjacent, and delivering said row to, a receiving point in the laminating mechanism.

3. Apparatus, as in claim 2, including longitudinal guide bars above and below said alined runs in cooperating and guiding relation thereto; one of said guide bars being mounted for limited vertical motion, and spring means urging said one guide bar in the direction of the other guide bar.

4. Apparatus, as in claim 3, in which said guide bars are longitudinally channeled and said alined runs traveling in and projecting out of the channels; there being a longitudinal row of spring pressed shoes mounted on one guide bar in the related channel, and said shoes being in engagement with the corresponding alined run and urging the same in the direction of the other alined run.

5. Apparatus for continuous-run manufacture of composite sheet material having an intermediate lamination of transversely extending wood veneer sections in a longitudinal row, and outer laminations of paper in longitudinal runs adhesively bonded thereto; said apparatus comprising, in timed driven relation, a longitudinal initial conveyor including transversely spaced outer advancing runs and a central advancing run therebetween, all said runs advancing at the same speed, longitudinally spaced pusher lugs on the outer runs in transverse alinement, longitudinally spaced pusher lugs on the central run intermediate adjacent transversely alined pairs of the lugs on said outer runs, a veneer feeding unit associated with said initial conveyor intermediate its ends operative to feed transversely extending, longitudinally spaced wood veneer sections onto said conveyor in a row with certain of said sections engaged at the rear edge by alined lugs on the outer runs and other of said sections engaged at the rear edge by lugs on the central run, the conveyor including rotary elements over which all said runs turn at the forward end, the rotary element for the central run being disposed rearwardly of the rotary elements for the outer runs whereby the lugs on said central run escape said other wood veneer sections before the lugs on the outer runs escape said certain sections, the latter then advancing into edge abutting and pushing relation to said other sections at a point rearwardly of the delivery end of said initial conveyor, a sheet material laminating mechanism disposed adjacent but beyond the delivery end of said initial conveyor, such mechanism feeding the runs of paper and being operative to receive and adhesively bond the row of wood veneer sections therebetween, and means to feed the row from said delivery end of the initial conveyor to said laminating mechanism without altering the spacing of the wood veneer sections existent in the row at said delivery end of the initial conveyor.

6. Apparatus, as in claim 5, in which said row feeding means comprises a transfer conveyor including vertically alined pairs of longitudinal endless conveyors disposed in transversely spaced relation; each such pair of conveyors having cooperating longitudinal runs, a rear portion of which are laterally offset from but lap a forward portion of a corresponding outer run of the initial conveyor whereby the row of wood veneer sections enters between said cooperating runs before delivery from said initial conveyor.

7. Apparatus, as in claim 6, including longitudinal upper and lower guide bars extending along cooperating runs, one of said guide bars being normally fixed and the other vertically yieldable, spring means urging said other guide bar in the direction of said one guide bar whereby the cooperating runs therebetween are caused to frictionally engage the row of wood veneer sections therebetween.

8. Apparatus, as in claim 5, including a flexible drag member engaging lengthwise atop the row of wood veneer sections in the zone of said point rearwardly of the delivery end of the initial conveyor.

9. Apparatus for continuous-run manufacture of composite sheet material having an intermediate lamination of transversely extending wood veneer sections in a longitudinal row, and outer laminations of paper in longitudinal runs adhesively bonded thereto; said apparatus comprising, in timed driven relation, a longitudinal initial conveyor having an advancing run, means to feed a row of wood veneer sections onto the initial conveyor for advance by said run, the wood veneer sections as so fed having a predetermined spacing therebetween longitudinally of the initial conveyor, means operative upon advance of the row of wood veneer sections to cause closing of the spaces between certain of said sections before the row reaches the delivery end of the initial conveyor, a sheet material laminating mechanism disposed adjacent but beyond the delivery end of the initial conveyor, such mechanism feeding the runs of paper and being operative to receive and adhesively bond the row of wood veneer sections therebetween, and a transfer conveyor operative to transfer the row of wood veneer sections from the delivery end of the initial conveyor to said laminating mechanism without altering the relative positions of the wood veneer sections existent at said delivery end.

10. Apparatus, as in claim 9, in which the transfer conveyor includes cooperating upper and lower longitudinal conveyor runs between which the row of wood veneer sections engages, the initial point of engagement being rearwardly of the delivery point of said initial conveyor, and the delivery point of said cooperating upper and lower runs being closely adjacent a row receiving point in said laminating mechanism; the latter including cooperating upper and lower transverse rolls at said row receiving point and each wood veneer section being engaged between said rolls in advance of escape from the delivery point of said cooperating upper and lower runs.

11. Apparatus, as in claim 10, in which said cooperating upper and lower runs diverge in a vertical longitudinal plane at their rear ends; and said runs being spring pressed one toward the other for a major portion of the length thereof.

12. Apparatus for continuous-run manufacture of composite sheet material having an intermediate lamination of transversely extending wood veneer sections in a longitudinal row, and outer laminations of paper in longitudinal runs adhesively bonded thereto; said apparatus comprising, in timed driven relation, a longitudinal initial conveyor having an advancing run, means to feed a row of wood veneer sections onto said run in predetermined spaced relation for advance by said run, means included with said initial conveyor to dispose alternate pairs of the veneer sections in non-spaced relation to each other at the delivery end of said conveyor, a sheet-material laminating mechanism disposed beyond the initial conveyor, and a transfer conveyor operative to transfer the row of sections to the laminating mechanism from said delivery end of the initial conveyor without disturbing the relation of the sections of the row to each other obtaining at such end of the initial conveyor.

13. Apparatus, as in claim 1, in which the initial conveyor includes a longitudinal trough on the upper edges of which the sections are supported, and a suction conduit connected to said trough.

14. An apparatus, as in claim 1, in which the transfer conveyor includes a vertically alined pair of endless members having cooperating runs extending lengthwise of the initial conveyor and arranged to engage the sections on the initial conveyor in gripping relation on opposite sides of the sections as such sections approach the delivery end of said initial conveyor, and to carry said sections from the initial conveyor to the laminating mechanism.

References Cited in the file of this patent
UNITED STATES PATENTS

| | | |
|---|---|---|
| 679,698 | Johnson | July 30, 1901 |
| 1,646,645 | Frederickson et al. | Oct. 25, 1927 |
| 2,565,868 | Mann et al. | Aug. 28, 1951 |
| 2,603,253 | Leash | July 15, 1952 |
| 2,662,648 | Van Schie | Dec. 15, 1953 |